US012724597B2

(12) United States Patent
Ono et al.

(10) Patent No.: US 12,724,597 B2
(45) Date of Patent: Sep. 1, 2026

(54) ROLLING UPDATE OF NETWORK FUNCTION

(71) Applicants: Rakuten Symphony, Inc., Tokyo (JP); Rakuten Mobile, Inc., Tokyo (JP)

(72) Inventors: Makoto Ono, Tokyo (JP); Yidao Wang, Tokyo (JP); Takatsugu Ishikawa, Tokyo (JP)

(73) Assignees: RAKUTEN SYMPHONY, INC., Tokyo (JP); Rakuten Mobile, Inc., Tokyo (JP)

(*) Notice: Subject to any disclaimer, the term of this patent is extended or adjusted under 35 U.S.C. 154(b) by 185 days.

(21) Appl. No.: 18/291,802

(22) PCT Filed: May 31, 2023

(86) PCT No.: PCT/JP2023/020300

§ 371 (c)(1),
(2) Date: Jan. 24, 2024

(87) PCT Pub. No.: WO2024/247169

PCT Pub. Date: Dec. 5, 2024

(65) Prior Publication Data

US 2025/0094152 A1 Mar. 20, 2025

(51) Int. Cl.
*G06F 8/65* (2018.01)

(52) U.S. Cl.
CPC .................................... *G06F 8/65* (2013.01)

(58) Field of Classification Search
CPC .......... G06F 8/65; G06F 8/656; H04W 24/04; H04W 28/084; H04W 36/16
See application file for complete search history.

(56) References Cited

U.S. PATENT DOCUMENTS 11,275,573 B1 * 3/2022 Javadekar ............... G06F 9/455
11,438,426 B1 * 9/2022 Shao ..................... H04L 67/143
11,740,889 B2 * 8/2023 Fukuyo ................... H04L 67/34
717/173
11,995,429 B2 * 5/2024 Hamasaki ............... H04L 67/06
12,039,319 B1 * 7/2024 Leung ................. G06F 11/3688
(Continued)

FOREIGN PATENT DOCUMENTS

JP 2006-074683 A 3/2006
JP 2019-519180 A 7/2019
(Continued)

OTHER PUBLICATIONS

International Search Report for PCT/JP2023/020300 dated Aug. 8, 2023 (PCT/ISA/210).

*Primary Examiner* — Daxin Wu
(74) *Attorney, Agent, or Firm* — Sughrue Mion, PLLC

(57) ABSTRACT

An update control apparatus has one or more processors that execute a process including: among a plurality of execution environments in each of which a process related to a communication terminal connected to an update cell is executed by executing software which is an update target, determining the number of execution environments to be stopped on the basis of the number of communication terminals connected to the update cell; and instructing, for each of the determined number of execution environments, an update of the software executed in each of the execution environments.

7 Claims, 5 Drawing Sheets

(56) References Cited

U.S. PATENT DOCUMENTS

2005/0208944 A1* 9/2005 Okita .................... H04W 24/02 455/442
2017/0311244 A1 10/2017 Kodaypak et al.
2018/0165084 A1* 6/2018 Mahimkar ................ G06F 8/65
2018/0165088 A1* 6/2018 Bonar ..................... G06F 21/50
2019/0026168 A1* 1/2019 Qiu ..................... G06F 9/45504
2019/0129745 A1 5/2019 Wang
2020/0186189 A1 6/2020 Herath et al.
2020/0186427 A1* 6/2020 Chunduru Venkata ...................... H04L 9/3268
2022/0276890 A1* 9/2022 Toda ....................... G06F 9/455
2022/0353134 A1* 11/2022 Lee ......................... H04L 12/12
2023/0275968 A1* 8/2023 Young ..................... H04L 67/34
2023/0397021 A1* 12/2023 Steben ................ H04L 41/0806
2024/0114363 A1* 4/2024 Miguel ................. H04L 41/145
2024/0289108 A1* 8/2024 Radha ....................... G06F 8/65
2024/0289109 A1* 8/2024 Radha ....................... G06F 8/65
2024/0394031 A1* 11/2024 White ....................... G06F 8/65

FOREIGN PATENT DOCUMENTS

JP 2022-530580 A 6/2022
JP 2024025552 A * 2/2024
WO 2020/226979 A2 11/2020
WO 2021/024417 A1 2/2021

* cited by examiner

ROLLING UPDATE OF NETWORK FUNCTION

CROSS REFERENCE TO RELATED APPLICATIONS

This application is a National Stage of International Application No. PCT/JP2023/020300 filed May 31, 2023.

TECHNICAL FIELD

The present disclosure relates to a rolling update of a network function.

BACKGROUND

In recent years, network functions in such as 5G wireless communication systems are sometimes virtualized and in this case are also referred to as Virtual Network Functions (VNFs). A VNF can be deployed in various locations in a network and enables a flexible network configuration to be realized. For example, when it is desired to reduce delays in a network service, rather than being deployed in a large-scale facility such as a Central Data Center (CDC) constructed at the center of a network, a VNF that provides a service to an end user is deployed in a medium-scale or small-scale facility such as a Regional Data Center (RDC) or Group Center (GC) that is located closer to the end user.

CITATION LIST

Patent Literature

Patent Document 1: JP 2022-530580 A
Patent Document 2: JP 2019-519180 A

SUMMARY OF INVENTION

Technical Problem

Generally, from the perspective of security, resource usage efficiency and the like, it is preferable for software to be updated, as appropriate. However, for software related to a function of a network such as the VNF described above, since networks are operated continuously, it is difficult to stop a function for an update. That is, updating a network function requires preparations such as notifying users of a service stoppage, to be carried out in advance, and thus, it is not easy to provide instantaneous updates.

The present disclosure was devised in the light of the foregoing and has an objective of providing a rolling update of a network function by which it is possible to update the network function while continuing to provide a service.

Solution to Problem

According to the one embodiment of the present disclosure, an update control apparatus has one or more processors that execute a process including: executing software, which is an update target, to determine, on the basis of the number of communication terminals connected to an update cell corresponding to the software, the number of execution environments to be stopped among a plurality of execution environments in which a process related to a communication terminal connected to the update cell is executed; and instructing, for each of the determined number of execution environments, an update of the software executed in each of the execution environments.

Further, according to another embodiment of the present disclosure, a communication control apparatus has one or more processors that execute a process including: executing software to construct a plurality of execution environments in which a process related to a communication terminal connected to a cell is to be executed; and when an update instruction for the software is acquired, excluding, from among the plurality of execution environments, at least an execution environment that is capable of corresponding to a communication terminal connected to the cell, and updating the software to be executed in the other execution environments.

Further, according to another embodiment of the present disclosure, an update control method includes: executing software, which is an update target, to determine, on the basis of the number of communication terminals connected to an update cell corresponding to the software, the number of execution environments to be stopped among a plurality of execution environments in which a process related to a communication terminal connected to the update cell is executed; and instructing, for each of the determined number of execution environments, an update of the software to be executed in each of the execution environments.

Further, according to another embodiment of the present disclosure, a software update method includes: executing software to construct a plurality of execution environments in which a process related to a communication terminal connected to a cell is to be executed; and when an update instruction for the software is acquired, excluding, from among the plurality of execution environments, at least an execution environment that is capable of corresponding to a communication terminal connected to the cell, and updating the software to be executed in the other execution environments.

DESCRIPTION OF EMBODIMENTS

Below, one embodiment according to the present disclosure will be described with reference to the attached drawings. The embodiment described below is exemplary and the present disclosure is not to be construed as being limited by these descriptions.

Figure 1:
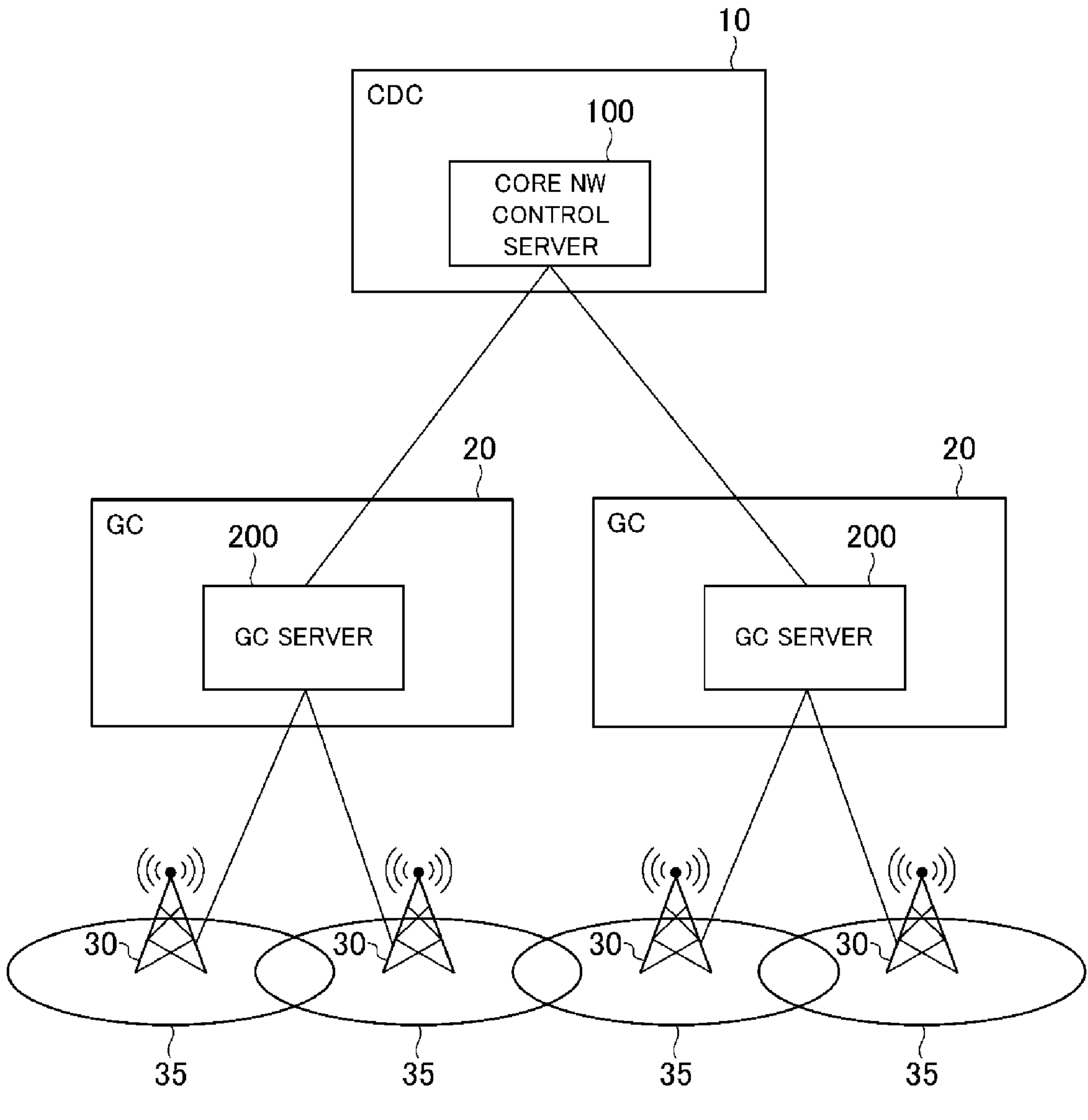
FIG. 1 is a diagram that illustrates one example of a communication system according to one embodiment.

FIG. 1 illustrates one example of a communication system according to one embodiment. In the communication system shown in FIG. 1, a plurality of GCs 20, which are small-scale facilities, are connected to a CDC 10, which is a large-scale facility. Note that although omitted in FIG. 1, a plurality of GCs 20 may be connected in a ring shape and an RDC may be connected between the CDC 10 and a GC 20.

The CDC 10 has a core network control server (hereinafter abbreviated to "core NW control server") 100 and the GCs 20 each have a GC server 200. Each GC server 200 has a radio unit (RU) 30, which is a wireless base station, connected thereto and the RUs 30 each form a cell 35 indicating a radio coverage range.

The core NW control server 100 is accommodated in the CDC 10 arranged at the center of a network constituting the communication system, and has a core network function in the communication system. That is, the core NW control server 100 deploys software including VNFs to the GC servers 200 of the GCs 20, and controls updates of the software deployed to each GC server 200. For example, the core NW control server 100 instructs a GC server 200 to update a VNF in units of pods, wherein a pod is an execution environment for executing a VNF. That is, the core NW control server 100 calculates, for a GC server 200 that controls a cell 35, the number of stoppable pods that can be stopped while maintaining provision of a service to users within the cell 35, determines the number of pods to be stopped so as to be equal to or less than the number of stoppable pods, and instructs the GC server 200 to update the VNF in the determined number of pods to be stopped at one time. Note that it is preferable for all pods to be updated as quickly as possible to shorten a period having both updated pods and non-updated pods. Due thereto, it is preferable to make the number of pods to be stopped large and reduce the total number of times an update is performed. The configuration and operations of the core NW control server 100 will be described in detail later.

The GC server 200 deploys various kinds of VNFs in accordance with instructions from the core NW control server 100 and executes the VNFs in a virtual environment to control communication in the communication system. For example, the GC server 200 executes VNFs that function as a Central Unit (CU) or a Distributed Unit (DU) and controls the RUs 30 that form respective cells 35. At that time, the GC server 200 generates a plurality of pods as VNF execution environments and executes the VNFs in the respective pods. For example, the GC server 200 may generate a plurality of pods corresponding to one cell 35 and execute a VNF in each pod to execute a process related to a user connected to the cell 35.

In addition, when instructed by the core NW control server 100 to update a VNF, the GC server 200 executes the update of the VNF in pods, in turn, for an instructed update pod number each time. That is, the GC server 200 sequentially executes the update of the VNF in a portion of the stoppable pods that are not being used in a process for providing a service. Due thereto, it is possible to update the VNF operating in the GC server 200 without having to entirely stop the VNF, and thus, it is possible to update a network function while maintaining a provision of service.

Figure 2:
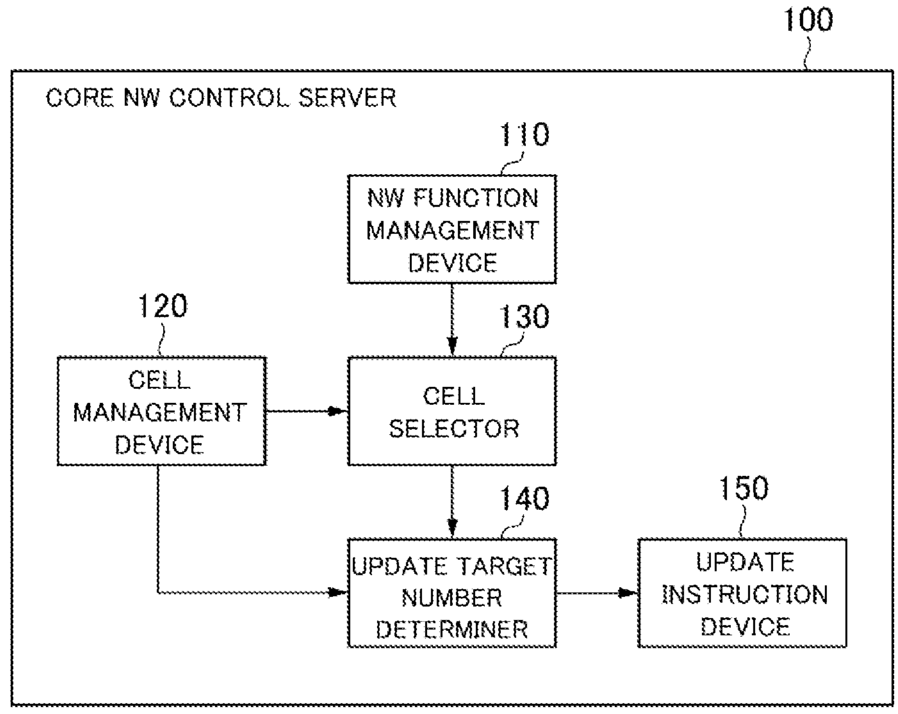
FIG. 2 is a block diagram that illustrates a configuration of a core NW control server according to one embodiment.

FIG. 2 is a block diagram illustrating a configuration of the core NW control server 100 according to one embodiment. The core NW control server 100 shown in FIG. 2 has a network function management device (hereinafter abbreviated to "NW function management device") 110, a cell management device 120, a cell selector 130, an update target number determiner 140, and an update instruction device 150.

The NW function management device 110 manages network functions operating in each GC server 200. That is, the NW function management device 110 stores information about VNFs deployed in each GC server 200 in association with identification information of the respective GC server 200. In addition, when it is time for a VNF to be updated, the NW function management device 110 notifies the cell selector 130 that a VNF update is required for the GC server 200 in which the VNF is deployed.

The cell management device 120 manages cells 35 under the control of each GC server 200. That is, the cell management device 120 stores information about cells 35 formed by the RUs 30 connected to each GC server 200 in association with the identification information of the respective GC server 200. The information about the cells 35 that is stored by the cell management device 120 includes: position information of a cell 35; the number of pods executing a VNF corresponding to a cell 35; information about a user terminal (UE: User Equipment; also referred to as communication terminal) located in a cell 35; and the like.

When notified by the NW function management device 110 that a VNF update is required, the cell selector 130 refers to information stored by the cell management device 120 and selects a cell 35 in which the update target VNF is operating. That is, the cell selector 130 selects a cell 35 (hereinafter referred to as "update cell") overseen by a GC server 200 in which the update target VNF is operating.

Further, the cell selector 130 refers to information stored by the cell management device 120 and selects a cell 35 (hereinafter referred to "peripheral cell") located in the periphery of the update cell. Here, the cell selector 130 may select a plurality of peripheral cells for one update cell. In addition, the cell selector 130 specifies, on the basis of information about UEs located in the update cell and the peripheral cell, a UE capable of being handed over from the update cell to the peripheral cell. Specifically, among UEs connected to the update cell, the cell selector 130 specifies, as a UE capable of being handed over, a UE located in a region in which the update cell and the peripheral cell overlap.

At that time, the cell selector 130 may expand the peripheral cell so that more UEs can be handed over. That is, the cell selector 130 may determine to expand the peripheral cell by raising the transmission power of the RU 30 forming the peripheral cell. Further, when a UE of the update cell is to be handed over to the peripheral cell, when it is determined that the capability of a pod for executing the corresponding VNF in the peripheral cell is insufficient, the cell selector 130 may determine to increase the corresponding pods in the peripheral cell. When it is determined that there is to be an adjustment relating to the peripheral cell, such as expanding the peripheral cell or increasing the number of corresponding pods in the peripheral cell, the cell selector 130 requests the GC server 200 that oversees the peripheral cell to make an adjustment relating to the peripheral cell.

The update target number determiner 140 determines the number of pods that are to be the VNF update target in the GC server 200 overseeing the update cell on the basis of the number of UEs connected to the update cell. When the number of UEs connected to the update cell decreases due to UEs being handed over to the peripheral cell, the update target number determiner 140 determines the number of pods that are to be the VNF update target in the GC server 200 overseeing the update cell, on the basis of the number of pods executing the VNF in the GC server 200 that respectively oversees the update cell and the peripheral cell, and the number of UEs that can be handed over from the update cell to the peripheral cell. For example, when a UE is to be handed over from the update cell to the peripheral cell, the update target number determiner 140 determines, on the basis of the number of UEs to be handed over to the peripheral cell and the number of UEs for which connection to the update cell is to be maintained, the number of pods to be stopped in the GC server 200 that oversees the update cell, and determines that the number of pods to be stopped is the number of pods that are the update target. That is, the update target number determiner 140 determines, as the number of pods that are the update target, the number of pods that are not required to be operated in the GC server 200 overseeing the update cell.

The update instruction device 150 generates an update instruction instructing an update of the VNF and transmits the generated update instruction to the GC server 200 that oversees the update cell. That is, the update instruction device 150 designates the number of pods to be stopped in the update cell and instructs the GC server 200 that oversees the update cell to update the VNF. When the number of UEs connected to the update cell decreases due to UEs being handed over to the peripheral cell, the update instruction device 150 also further designates the number of UEs to be handed over from the update cell to the peripheral cell. In such a manner, by handing over UEs to the peripheral cell, it is possible to increase the number of pods to be stopped in the update cell.

Figure 3:
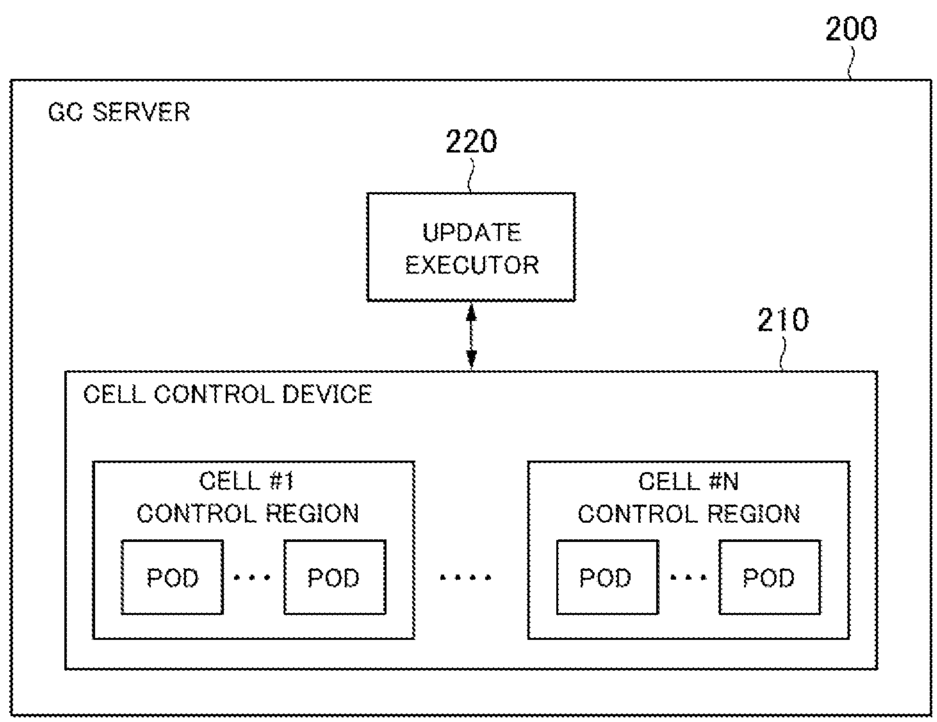
FIG. 3 is a block diagram that illustrates a configuration of a GC server according to one embodiment.

FIG. 3 is a block diagram illustrating a configuration of the GC server 200 according to one embodiment. The GC server 200 shown in FIG. 3 has a cell control device 210 and an update executer 220.

The cell control device 210 executes the VNF to control cells 35 that are overseen by the GC server 200. Here, the cell control device 210 constructs a pod for executing a VNF in a control region of each cell 35 formed by an RU 30 connected to the GC server 200, and executes a VNF having, for example, a function of a virtual DU (vDU) in each pod. At that time, the control region of each cell 35 has one or more pods constructed therein, and each of the pods executes a process related to a number of UEs in accordance with a processing capability. Note that the kinds of VNFs executed vary and may include a case in which pods are not divided for each cell 35.

Upon receiving a VNF update instruction from the core NW control server 100, the cell control device 210 instructs UEs located in respective cells 35 to perform a signal strength measurement for handover and, on the basis of the measurement results obtained from the UEs, determines whether or not each UE is to be handed over. In addition, the cell control device 210 designates a handover destination cell for the UEs for which handover was determined and instructs handover to be performed. Such a handover initiated by a network side is called a Network Initiated Handover. The present embodiment may use a general Network Initiated Handover method.

On the basis of the number of pods that are to be the VNF update target determined by the update target number determiner 140, the update executer 220 stops a portion of the pods in a control region of the update cell and executes the VNF update. When UEs connected to the update cell are to be handed over to the peripheral cell, upon receiving a VNF update instruction from the core NW control server 100, the update executer 220 determines whether or not the number of UEs designated by the update instruction have been handed over from the update cell to the peripheral cell. In addition, when the designated number of UEs have been handed over, on the basis of the number of pods that are to be the VNF update target, the update executer 220 stops a portion of the pods in the control region of the update cell and executes the VNF update in the stopped pods. Further, the update executer 220 sequentially changes the pods to be stopped and updates, in turn, all pods in the control region of the update cell. In other words, the update executer 220 stops a portion of the pods in turn and executes the VNF update for an update target pod number designated by the update instruction each time.

Figure 4:
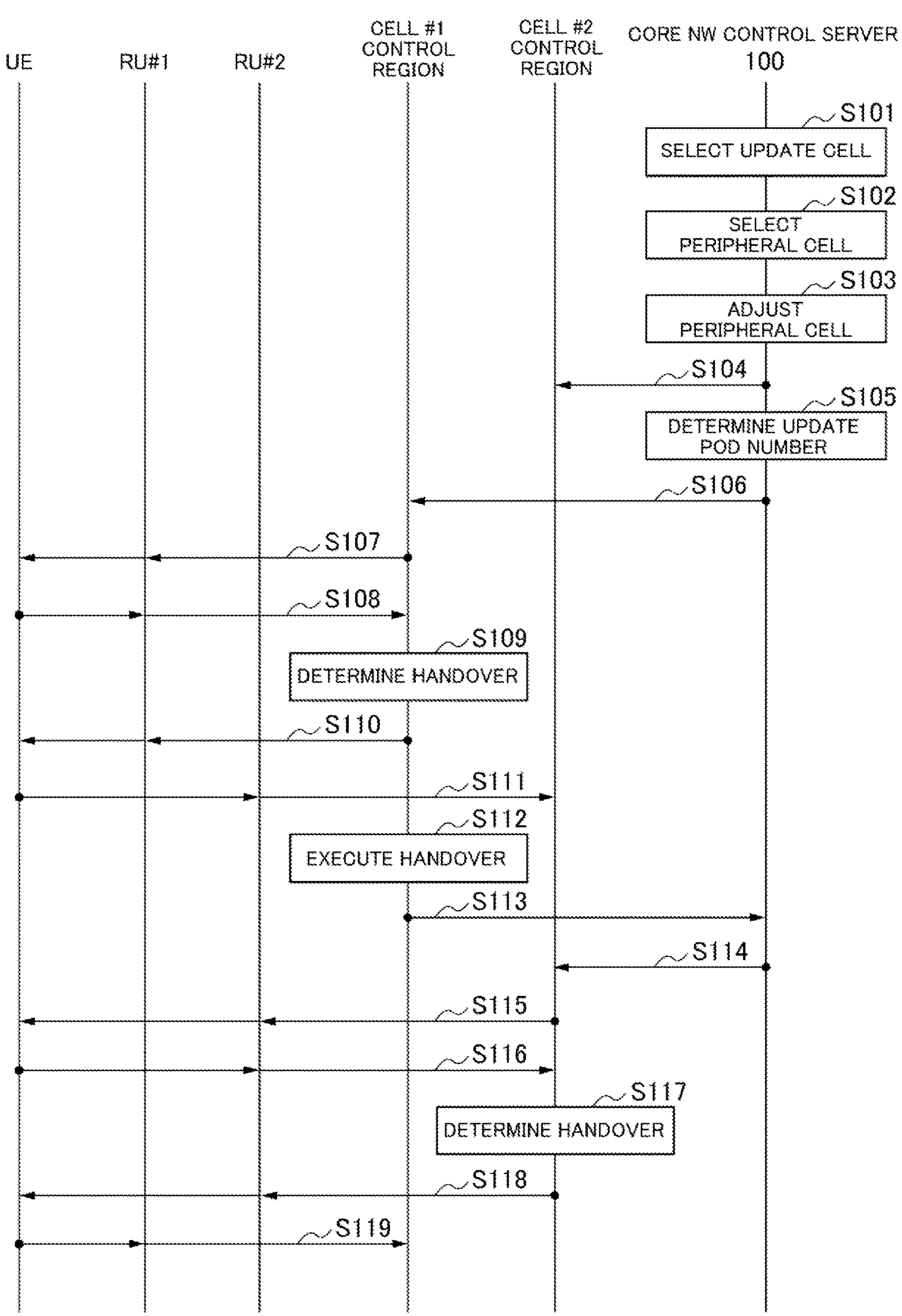
FIG. 4 is a diagram that illustrates a VNF update method according to one embodiment.

Next, a method for updating a VNF in the communication system configured in the manner described above shall be explained with reference to the sequence diagram shown in FIG. 4. Here, a case in which a UE connected to the update cell is handed over to the peripheral cell is described.

When it is time to update a VNF deployed in a GC server 200, the NW function management device 110 of the core NW control server 100 notifies the cell selector 130 that a VNF update is required for the GC server 200. Here, the explanation continues with an assumption that a VNF update is required for a GC server 200 that oversees cell #1 which is one of the cells 35.

Upon being notified that a VNF update is required, the cell selector 130 selects an update cell overseen by the GC server 200 in which the update target VNF operates (step S101). Here, the explanation continues with the assumption that cell #1 overseen by the GC server 200 is selected as the update cell.

Further, by referring to information stored by the cell management device 120, the cell selector 130 selects a peripheral cell located in the periphery of the update cell (step S102). Here, the explanation continues with an assumption that cell #2, which is one of the cells 35, is selected as the peripheral cell. Note that a plurality of peripheral cells may be selected for one update cell, and the GC server 200 that oversees the update cell and the GC 200 server that oversees the peripheral cell may be the same GC server 200 or may be different GC servers 200.

In addition, by referring to information stored by the cell management device 120, the cell selector 130 specifies a UE which can be handed over from the update cell to the peripheral cell. That is, among UEs connected to the update cell, a UE located in a region where the update cell and the peripheral cell overlap is specified as a UE that can be handed over. At that time, an adjustment of the peripheral cell may be performed wherein the peripheral cell is expanded by raising the transmission power of RU #2 which forms the peripheral cell, or the corresponding pods in the peripheral cell are increased (step S103). When adjusting the peripheral cell, the cell #2 control region of the GC server 200 that oversees cell #2 is instructed to raise the transmission power of RU #2 or increase the pods (step S104).

In accordance with the instruction, the cell #2 control region expands the peripheral cell by raising the transmission power of RU #2 or increases the corresponding pods in cell #2. In such a manner, by expanding the peripheral cell or increasing the pods, the number of UEs to be handed over from the update cell to the peripheral cell is increased. That is, the minimum number of UEs maintaining a connection with the update cell is made smaller than that before the periphery cell was expanded or before the pods were increased. Due thereto, the number of stoppable pods in the cell #1 control region of the GC server 200 that oversees cell #1 can be made larger.

When the number of UEs that can be handed over from the update cell to the peripheral cell has been specified, the update target number determiner 140 determines the number of pods that are to be the update target in the cell #1 control region of the GC server 200 that oversees cell #1 (step S105). Specifically, when UEs are to be handed over from the update cell to the peripheral cell, a number of pods to be stopped that is equal to or lower than the number of stoppable pods in the cell #1 control region is determined to be the number of pods that are the update target.

In addition, an update instruction designating the number of UEs to be handed over from the update cell to the peripheral cell and the number of update target pods is transmitted to the cell #1 control region of the GC server 200 cell that oversees cell #1 (step S106).

When the update instruction is received by the GC server 200 that oversees the update cell, the cell #1 control region transmits, via RU #1, a signal strength measurement instruction to the UEs connected to cell #1 (step S107). Upon receiving the measurement instruction, the UEs measure the signal strength from RUs 30 including RU #1 and RU #2 which are located in the vicinity. In addition, the UEs transmit signal strength measurement results to the GC server 200 via RU #1 (step S108).

When the signal strength measurement results are received by the GC server 200, the cell #1 control region determines whether or not a UE can be handed over from the update cell to the peripheral cell (step S109). That is, the cell #1 control region determines whether or not a signal strength from RU #2 forming the peripheral cell is a prescribed threshold value or higher, and when the signal strength is the prescribed threshold value or higher, the cell #1 control region determines that the UE is to be handed over to cell #2 which is the peripheral cell. In addition, the cell #1 control region transmits, via RU #1, a handover-to-cell #2 instruction to the UEs for which it was determined that handover is to be performed (step S110).

Upon receiving the handover instruction, the UEs execute handover to the designated cell #2 and start to communicate with the cell #2 control region via RU #2 that forms cell #2 (step S111). When the UEs have been handed over to cell #2, the processing amount relating to UEs decreases in the cell #1 control region, and therefore, it becomes possible to stop a portion of the pods.

When the UEs execute a handover to the peripheral cell, the update executer 220 determines whether or not at least the number of UEs designated by the update instruction have been handed over from the update cell to the peripheral cell. When the result of the determination is that at least the designated number of UEs have been handed over to the peripheral cell, it is determined that the processing amount in the cell #1 control region has sufficiently decreased, and thus, an update of the VNF executed in the pod of the cell #1 control region is executed (step S112).

Specifically, a portion of the pods are stopped in the cell #1 control region and an update of the VNF is executed in the stopped pods. At that time, pods are sequentially stopped, with the number of pods stopped at one time being the number of target update pods designated by the update instruction, and the VNF in the stopped pods is updated. A specific example of such a VNF update shall be explained with reference to FIG. 5.

Figure 5:
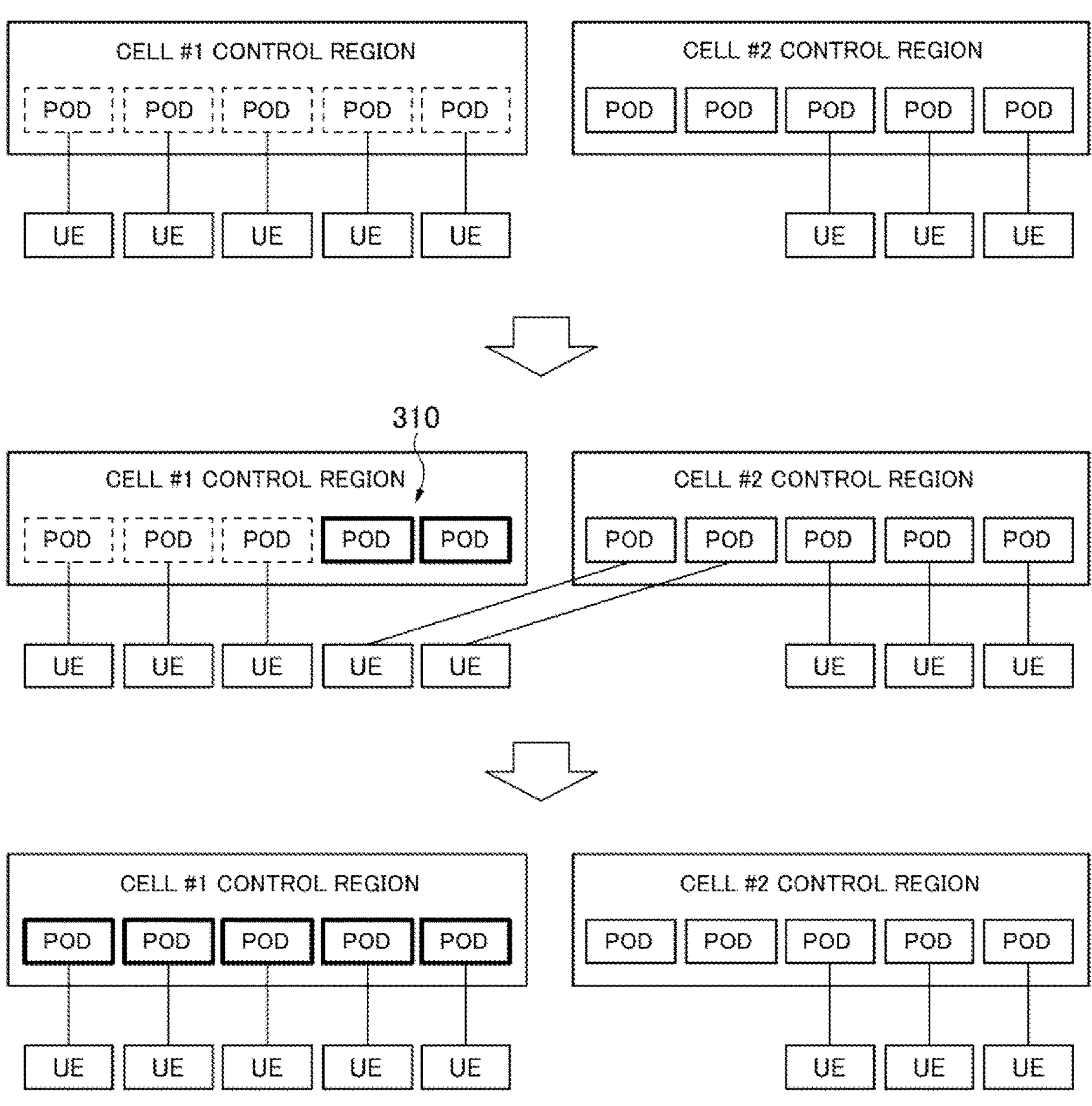
FIG. 5 is a diagram that explains a specific example of a VNF update.

As shown in the upper part of FIG. 5, pods constructed in the cell #1 control region each execute a VNF to execute a process relating to a UE located in the cell #1. Similarly, pods constructed in the cell #2 control region each execute a VNF to execute a process relating to a UE located in cell #2. Since cell #1 is an update cell, UEs located in cell #1 execute a handover to cell #2 which is the peripheral cell.

As a result thereof, as shown in the central part of FIG. 5, a portion of the UEs located in cell #1 are handed over to cell #2, and processes relating to the handed over UEs are executed by the pods constructed in the cell #2 control region. Due thereto, two pods 310 in the cell #1 control region no longer operate, and thus, can be stopped. Here, an update of the VNF in the two pods 310 is executed, and VNF updates are then executed sequentially by stopping two pods at a time. During this time, three pods which are not update targets are operating in the cell #1 control region, and therefore, it is possible to continue service provision to the UEs located in cell #1.

When the update of the VNF in all pods in the cell #1 control region has finished, as shown in the lower part of FIG. 5, the UEs that were handed over to cell #2 are handed over to cell #1 again and processes relating to each UE are executed by the updated VNF. Note that although omitted in FIG. 5, after the VNF in all pods of the cell #1 control region has been updated, the VNF in all pods of the cell #2 control region may be updated in the same manner.

Returning to FIG. 4, when the update of the VNF in all pods of the cell #1 control region has finished, the cell #1 control region notifies the core NW control server 100 that the VNF update has finished (step S113). The core NW control server 100 notifies the cell #2 control region that the VNF update in the cell #1 control region has finished (step S114), and in a case in which the transmission power of RU #2 was raised or the pods were increased, the adjustment to the peripheral cell is finished.

Upon being notified that the VNF update has finished, the cell #2 control region transmits, via RU #2, a signal strength measurement instruction to the UEs connected to cell #2 (step S115). Upon receiving the measurement instruction, the UEs measure the signal strength from RUs 30 including RU #1 and RU #2 which are located in the vicinity. In addition, the UEs transmit signal strength measurement results to the GC server 200 via RU #2 (step S116).

When the signal strength measurement results are received by the GC server 200, the cell #2 control region determines whether or not a UE can be handed over from the peripheral cell to the update cell (step S117). That is, the cell #2 control region determines whether or not a signal strength from RU #1 forming the update cell is a prescribed threshold value or higher, and when the signal strength is the prescribed threshold value or higher, the cell #2 control region determines that the UE is to be handed over to cell #1 which is the update cell to which the UE was originally connected. In addition, the cell #2 control region transmits, via RU #2, a handover-to-cell #1 instruction to the UEs for which it was determined that handover is to be performed (step S118).

Upon receiving the handover instruction, the UEs execute handover to the designated cell #1 and start to communicate with the cell #1 control region via RU #1 that forms cell #1 (step S119). Thereafter, the VNF update may also be executed in the cell #2 control region in the same manner as the VNF update in the cell #1 control region.

As described above, according to the present embodiment, when a VNF deployed in a GC server is to be updated, the VNF update is executed by stopping a portion of pods on the basis of the number of UEs connected to a cell overseen by the GC server. Further, UEs connected to the cell overseen by the GC server are handed over and the processing amount for controlling the cell decreases, and thus, it is possible to execute the VNF update sequentially in pods, with the VNF update being executed in turn for the number of pods that are not operating. In such a manner, it is possible to update a VNF operating in a GC server without having to entirely stop the VNF, and, thus, it is possible to update a network function while maintaining service provision.

Figure 6:
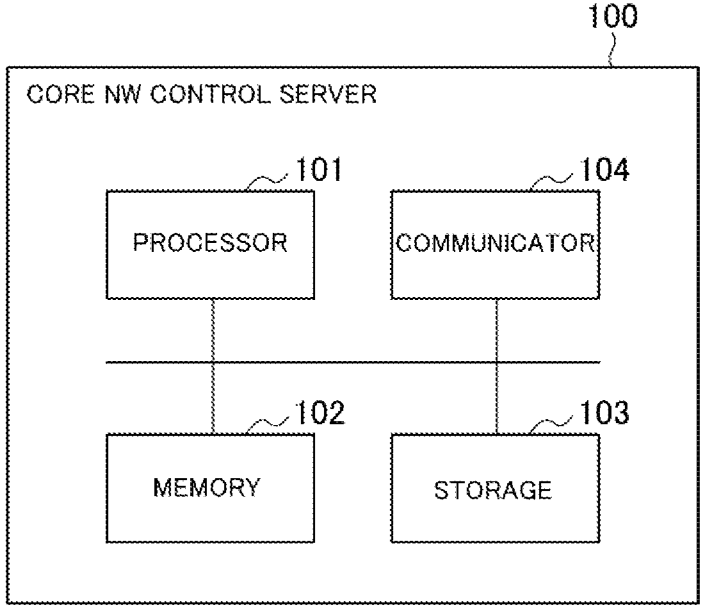
FIG. 6 is a block diagram that illustrates an example of a hardware configuration of a core NW control server.

The core NW control server 100 according to the embodiment described above may be configured by using a processor and a memory. FIG. 6 is a block diagram illustrating one example of a hardware configuration of the core NW control server 100 according to one embodiment. As shown in FIG. 6, the core NW control server 100 includes a processor 101, a memory 102, a storage 103, and a communicator 104.

The processor 101 includes, for example, a Central Processing Unit (CPU), a Field Programmable Gate Array (FPGA), a Digital Signal Processor (DSP), or the like, and performs integrated control of the core NW control server 100 as well as executing various kinds of information processing.

The memory 102 includes, for example, a Random Access Memory (RAM), a Read Only Memory (ROM), or the like, and stores information used in information processing executed by the processor 101.

The storage 103 includes, for example, a Hard Disk Drive (HDD), a Solid State Drive (SSD), or the like, and stores various kinds of data.

The communicator 104 includes an interface for executing wired communication or wireless communication and communicates with the GC server 200.

Note that the core NW control server 100 may have another configuration not shown in the drawings, such as, for example, a display or an operation switch.

Figure 7:
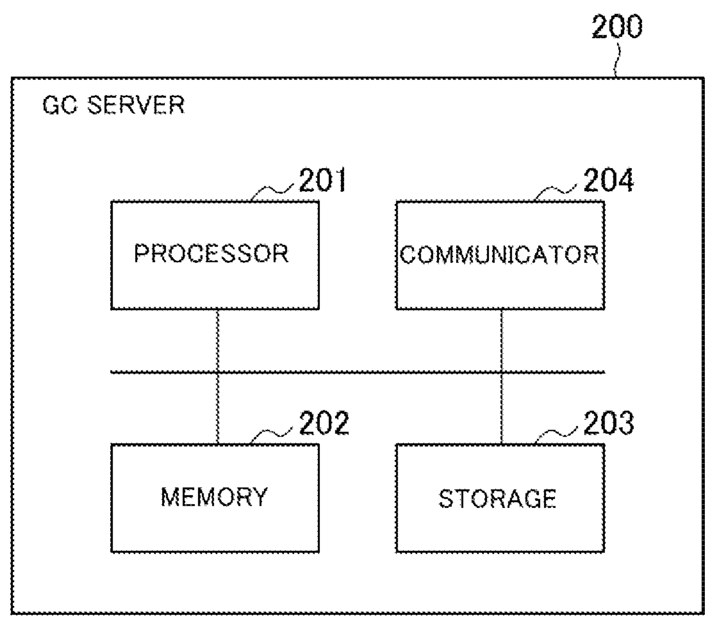
FIG. 7 is a block diagram that illustrates an example of a hardware configuration of a GC server.

Similarly, the GC server 200 according to the embodiment described above may be configured by using a processor and a memory. FIG. 7 is a block diagram illustrating one example of a hardware configuration of the GC server 200 according to one embodiment. As shown in FIG. 7, the GC server 200 includes a processor 201, a memory 202, a storage 203, and a communicator 204.

The processor 201 includes, for example, a CPU, an FPGA, a DSP, or the like, and performs integrated control of the entire GC server 200 as well as executing various kinds of information processing.

The memory 202 includes, for example, a RAM, a ROM, or the like, and stores information used in information processing executed by the processor 201.

The storage 203 includes, for example, an HDD, an SSD, or the like, and stores various kinds of data.

The communicator 204 includes an interface for executing wired communication or wireless communication and communicates with the core NW control sever 100 and other GC servers 200.

Note that GC server 200 may have another configuration not shown in the drawings, such as, for example, a display or an operation switch.

The processing by the core NW control server 100 and the GC server 200 described in the embodiment above may each be written as a program that is executable by a computer. In that case, the programs can be stored on a computer-readable non-transitory recording medium and installed onto a computer. Examples of such a recording medium include portable recording media such as CD-ROMs, DVD disks, USB memories, and the like, and semiconductor memories such as flash memories, and the like.

Note that the present disclosure is not limited to the above embodiments and includes various modified examples in which constituent elements have been added, removed, or replaced with respect to the configurations described above.

Additionally, the term "connect" used in the present disclosure means a logical connection for communication. For example, "B connected to A" means that A and B are logically connected such that communication therebetween is possible. Accordingly, there is no need for A and B to be directly connected in a physical manner by using physical cables, or the like, and A and B may be connected via multiple devices or by wireless communication.

The present disclosure described above includes the following [1] to [10].

[1] An update control apparatus having one or more processors that execute a process including:

among a plurality of execution environments in each of which a process related to a communication terminal connected to an update cell is executed by executing software which is an update target, determining the number of execution environments to be stopped on the basis of the number of communication terminals connected to the update cell; and instructing, for each of the determined number of execution environments, an update of the software executed in each of the execution environments.

[2] The update control apparatus described in [1] above wherein:

the process further includes determining, from among the communication terminals connected to the update cell, the number of communication terminals to be connected to a peripheral cell located in the periphery of the update cell, and the number of communication terminals that are to remain connected to the update cell; and the number of execution environments to be stopped is determined on the basis of the number of communication terminals that are to remain connected to the update cell.

[3] The update control apparatus described in [1] or [2] above wherein the process further includes expanding the peripheral cell by raising transmission power of a wireless base station that forms the peripheral cell to make the minimum number of communication terminals that are to remain connected to the update cell smaller than the number of communication terminals that are connected to the update cell before the peripheral cell is expanded.

[4] The update control apparatus described in [1] or [2] above, wherein the process further includes increasing the execution environment in which a process related to a communication terminal connected to the peripheral cell is executed to make the minimum number of communication terminals that are to remain connected to the update cell smaller than the number of communication terminals that are connected to the update cell before the execution environment is increased.

[5] A communication control apparatus having one or more processors that execute a process including:

executing software to construct a plurality of execution environments in each of which a process related to a communication terminal connected to a cell is executed; and when an update instruction for the software is acquired, updating the software executed in an execution environment excluding, from among the plurality of execution environments, at least an execution environment that is capable of covering a communication terminal connected to the cell.

[6] The communication control apparatus described in [5] above, wherein the process further includes, when the update instruction for the software is acquired, causing a communication terminal connected to the cell to connect to another cell.

[7] The communication control apparatus described in [6] above, wherein the causing the communication terminal to connect includes:

causing communication terminals connected to the cell to measure signal strength with respect to the cell and the other cell; and causing a communication terminal in which the measured signal strength with respect to the other cell is a prescribed threshold value or higher to connect to the other cell.

[8] The communication control apparatus described in [6] or [7] above, wherein the updating includes updating the software when the number of communication terminals connected to the other cell is equal to or greater than the number of communication terminals designated by the update instruction.

[9] An update control method including:

among a plurality of execution environments in each of which a process related to a communication terminal connected to an update cell is executed by executing software which is an update target, determining the number of execution environments to be stopped on the basis of the number of communication terminals connected to the update cell; and instructing, for each of the determined number of execution environments, an update of the software executed in each of the execution environments.

[10] A software update method including:

executing software to construct a plurality of execution environments in each of which a process related to a communication terminal connected to a cell is executed; and when an update instruction for the software is acquired, updating the software executed in an execution environment excluding, from among the plurality of execution environments, at least an execution environment that is capable of covering a communication terminal connected to the cell.

REFERENCE SIGNS LIST

100 Core NW control server
101, 201 Processor
102, 202 Memory
103, 203 Storage
104, 204 Communicator
110 NW function management device
120 Cell management device
130 Cell selector
140 Update target number determiner
150 Update instruction device
200 GC server
210 Cell control device
220 Update executer

The invention claimed is:

1. An update control apparatus comprising:

at least one memory storing instructions; and at least one processor configured to execute the instructions to perform a process comprising:

acquiring the number of communication terminals in a first cell;

among a plurality of execution environments including one or more target virtual network functions that are to be updated, executing a process to provide a service for one or more communication terminals in the first cell;

determining, from among the communication terminals in the first cell, communication terminals that are incapable of being handed over to any of one or more peripheral cells located in the periphery of the first cell;

determining, on the basis of the number of the determined communication terminals in the first cell, the number of execution environments to be stopped at one time while maintaining provision of the service to the one or more communication terminals in the first; and transmitting an instruction to update one or more target virtual network functions executed in a subset of the plurality of execution environments, the subset having the determined number of execution environments to be stopped at one time.

2. The update control apparatus according to claim 1, wherein the process further comprises:

transmitting an instruction for expanding at least one of the one or more peripheral cells to reduce the number of communication terminals that are incapable of being handed over to any of the one or more peripheral cells.

3. The update control apparatus according to claim 1, wherein the process further comprises:

transmitting an instruction for increasing capacity for accommodating communication terminals of at least one of the one or more peripheral cells to reduce the number of communication terminals that are incapable of being handed over to any of the one or more peripheral cells.

4. A communication control apparatus comprising:

at least one memory storing instruction; and at least one processor configured to execute the instructions to perform a process comprising:

executing software to construct a plurality of execution environments in each of which one or more virtual network functions execute a process to provide a service for one or more communication terminals in a first cell acquiring an instruction for updating a virtual network function; and updating, at one time, one or more virtual network functions executed in a subset of the plurality of execution environments with stopping the subset of the plurality of execution environments, wherein the subset has a specific number of execution environments to be stopped at one time while maintaining provision of the service to the one or more communication terminals in the first cell, the specific number being determined on the basis of the number of communication terminals in the first cell.

5. The communication control apparatus according to claim 4, wherein the process further comprises causing one or more communication terminals in the first cell to, before updating, hand over, at one time, the one or more virtual network functions.

6. An update control method comprising:

acquiring the number of communication terminals in a first cell;

among a plurality of execution environments including one or more target virtual network functions that are to be updated, executing a process to provide a service for one or more communication terminals in the first cell;

determining, from among the communication terminals in the first cell, communication terminals that are incapable of being handed over to any of one or more peripheral cells located in the periphery of the first cell;

determining, on the basis of the number of the determined communication terminals in the first cell, the number of execution environments to be stopped at one time while maintaining provision of the service to the one or more communication terminals in the first cell; and transmitting an instruction to update one or more target virtual network functions executed in a subset of the plurality of execution environments, the subset having the determined number of execution environments to be stopped at one time.

7. A software update method comprising:

executing software to construct a plurality of execution environments in each of which one or more virtual network functions execute a process to provide a service for one or more communication terminals in a first cell;

acquiring an instruction for updating a virtual network function; and updating, at one time, one or more virtual network functions executed in a subset of plurality of execution environments with stopping the subset of the plurality of execution environments, wherein the subset has a specific number of execution environments to be stopped at one time while maintaining provision of the service to the one or more communication terminals in the first cell, the specific number being determined on the basis of the number of communication terminals in the first cell.

* * * * *